United States Patent
Ferreol et al.

(10) Patent No.: US 8,248,304 B2
(45) Date of Patent: Aug. 21, 2012

(54) METHOD FOR MEASURING INCOMING ANGLES OF COHERENT SOURCES USING SPACE SMOOTHING ON ANY SENSOR NETWORK

(75) Inventors: Anne Ferreol, Colombes (FR); Jeremy Brugier, Paris (FR); Philippe Morgand, Athis-Mons (FR)

(73) Assignee: Thales, Neuilly sur Seine (FR)

( * ) Notice: Subject to any disclaimer, the term of this patent is extended or adjusted under 35 U.S.C. 154(b) by 157 days.

(21) Appl. No.: 12/663,561

(22) PCT Filed: Jun. 9, 2008

(86) PCT No.: PCT/EP2008/057165
§ 371 (c)(1),
(2), (4) Date: Oct. 18, 2010

(87) PCT Pub. No.: WO2008/155250
PCT Pub. Date: Dec. 24, 2008

(65) Prior Publication Data
US 2011/0025563 A1     Feb. 3, 2011

(30) Foreign Application Priority Data

Jun. 8, 2007 (FR) ...................... 07 04113

(51) Int. Cl.
*G01S 1/12* (2006.01)
(52) U.S. Cl. ...................................................... 342/417
(58) Field of Classification Search ................... 342/417
See application file for complete search history.

(56) References Cited

OTHER PUBLICATIONS

Wax, et al, 1994. "Direction finding of coherent signals via spatial smoothing for uniform circular arrays." IEEE Transactions on Antennas and Propagation 42(5): 613-620.
Friedlander, et al, 1992. "Direction Finding Using Spatial Smoothing With Interpolated Arrays." IEEE Transactions on Aerospace and Electronic Systems 28(2): 574-586.
Reddy, et al, 1996. "Analysis of interpolated arrays with spatial smoothing." Signal Processing 54(3): 261-272.

*Primary Examiner* — Harry Liu
(74) *Attorney, Agent, or Firm* — Stroock & Stroock & Lavan LLP

(57) ABSTRACT

A method for interpolating steering vectors $a(\theta)$ of a sensor network, the sensor network receiving signals transmitted by a source, characterized in that, for the interpolation of the steering vectors $a(\theta)$, use is made of one or more omnidirectional modal functions $z(\theta)^k$ where $z(\theta)=\exp(j\theta)$ where $\theta$ corresponds to an angle sector on which the interpolation of the steering vectors is carried out.

6 Claims, 5 Drawing Sheets

METHOD FOR MEASURING INCOMING ANGLES OF COHERENT SOURCES USING SPACE SMOOTHING ON ANY SENSOR NETWORK

CROSS REFERENCE TO RELATED APPLICATIONS

The present application is the U.S. National Phase of International Patent Application Serial No. PCT/EP2008/057165, filed Jun. 9, 2008, which claims the benefit of French Patent Application Serial No. 0704113, filed Jun. 8, 2007, both of which are hereby incorporated by reference in their entireties.

FIELD OF INVENTION

The invention relates notably to a method making it possible to interpolate steering vectors of a network of any sensors by using omnidirectional modal functions.

It also relates to a method and a system making it possible, notably, to estimate arrival angles of coherent sources via a smoothing technique on a network of nonuniform sensors.

It is used, for example, in all the location systems in an urban context where the propagation channel is disrupted by a large number of obstacles such as buildings.

In a general manner, it may be used to locate transmitters in a difficult propagation context, urban, semi-urban (airport), inside buildings, etc.

It may also be used in medical imaging methods for locating tumors or epileptic focal spots.

It applies in sounding systems for mining and oil research in the seismic field. These applications require estimates of arrival angles with multipaths in the complex propagation medium of the earth's crust.

PRIOR ART

The technical field is that of the processing of antennae which process the signals of several transmitting sources based on a multisensor receiving system. In an electromagnetic context, the sensors are antennae and the radioelectric sources are propagated according to one polarization. In an acoustic context, the sensors are microphones and the sources are sound sources. FIG. 1 shows that an antenna processing system consists of a network of sensors receiving sources with different incoming angles $\theta_{mp}$. The field is, for example, that of goniometry which consists in estimating the incoming angles of the sources.

The elementary sensors of the network receive the sources with a phase and an amplitude that is dependent in particular on their angles of incidence and on the position of the sensors. The angles of incidence are in parametric representation in 1D by the azimuth $\theta_m$ and in 2D by the azimuth $\theta_m$ and the elevation $\Delta_m$. According to FIG. 2, a 1D goniometry is defined by techniques which estimate only the azimuth supposing that the source waves are propagated in the plane of the sensor network. When the goniometry technique jointly estimates the azimuth and the elevation of a source, it is a question of 2D goniometry.

The objective of antenna processing techniques is to make use of spatial diversity which consists in using the position of the antennae of the network to make better use of the differences in incidence and distance of the sources.

FIG. 3 illustrates an application to goniometry in the presence of multipaths. The mth source is propagated on P paths of incidences $\theta_{mp}$ ($1 \leq p \leq P$) which are caused by P−1 obstacles in the radioelectric environment. The problem treated in the method according to the invention is notably the situation of coherent paths where the propagation time difference between the direct path and a secondary path is much less than the inverse of the band of the signal.

The technical problem to be solved is also that of the goniometry of coherent paths with a reduced calculation cost and a network of sensors with a nonuniform geometry.

Knowing that the goniometry techniques with a reduced calculation cost are suitable for networks of equally-spaced linear sensors, one of the objects of the method according to the invention is to use these techniques on networks of nonuniform sensors.

The algorithms making it possible to process the case of coherent sources are, for example, the algorithms of Maximum Likelihood [2][3] which can be applied to sensor networks with nonuniform geometry. However, these algorithms need multiparameter estimates which induce an application with a high calculation cost.

The maximum likelihood technique is adapted for the cases of equally-spaced linear sensor networks via the IQML or MODE [7][8] methods. Another alternative is that of the spatial smoothing techniques [4][5] which have the advantage of processing the coherent sources with a low calculation cost. The goniometry techniques with a low calculation cost adapted for linear networks are either the ESPRIT method [9][10] or techniques of the Root type [11][12] amounting to searching for the roots of a polynomial.

The techniques making it possible to transform networks with nonuniform geometry into linear networks are described, for example, in documents [6] [5] [11]. These methods consist in interpolating on an angular sector the response of the sensor network to a source: Calibration Table.

The document of B. Friedlander and A. J. Weiss entitled "Direction Finding using spatial smoothing with interpolated arrays", IEEE Transactions on Aerospace and Electronic Systems, Vol. 28, No. 2, pp. 574-587, 1992, discloses a method which is consists in:

interpolating the sensor network via a linear network in a determined angular sector with an interpolation function that is not omnidirectional in azimuth, decorrelating the paths by a spatial smoothing technique.

This technique, although powerful, has the disadvantages:

of processing the case of coherent sources present in the same angular sector, hence of processing a single angular sector;

of interpolating with a function that is not omnidirectional in azimuth.

SUMMARY OF INVENTION

The invention relates to a method for determining the angles of arrival of coherent sources in a system comprising several nonuniform sensors, the signals being propagated along coherent or substantially coherent paths between a source and said receiving sensors of the network. It is characterized in that use is made of at least one modal interpolation function $z(\theta)^k$ that is omnidirectional in azimuth where $z(\theta)=\exp(j\theta)$ with $\theta$ corresponding to an angle sector on which the interpolation of the steering vectors $a(\theta)$ of the sensor network is carried out in order to process the signals transmitted by the sources and received on the sensor network and a spatial smoothing technique is applied in order to deco rrelate the coherent sources, the interpolation function $We(\theta)$ is expressed in the following manner:

$$a(\theta) \approx We(\theta) \text{ with } e(\theta) = \begin{bmatrix} z(\theta)^{-L} \\ \vdots \\ z(\theta)^{L} \end{bmatrix} = \begin{bmatrix} \exp(-jL\theta) \\ \vdots \\ \exp(jL\theta) \end{bmatrix}$$

for $0 \leq \theta < 360°$

The matrix W of dimension $N \times (2L+1)$ is obtained by minimizing in the sense of the least squares the deviation $\|a(\theta)-We(\theta)\|^2$ for azimuths verifying $0 \leq \theta \leq 360°$, the length of the interpolation $2L+1$ depends on the aperture of the network.

The method according to the invention notably offers the following advantages:

- It interpolates the sensor network with omnidirectional functions in azimuth.
- It processes the case of coherent sources on different angular sectors.
- It uses the algorithm from 0 to 360° in azimuth.
- It applies a spatial smoothing technique in order to decorrelate the coherent sources.

BRIEF DESCRIPTION OF THE DRAWINGS

Other features and advantages of the present invention will appear more clearly on reading the following description of an exemplary embodiment given as an illustration and being in no way limiting with the addition of figures which represent.

DETAILED DESCRIPTION OF THE PREFERRED EMBODIMENTS

Before giving details of an exemplary embodiment of the method according to the invention, a few notes on modeling the output signal of a sensor network are given.

Modeling the Output Signal from a Sensor Network

In the presence of M sources with $P_m$ multipaths for the mth source, the output signal, after receipt on all the sensors of the network:

$$x(t) = \begin{bmatrix} x_1(t) \\ \vdots \\ x_N(t) \end{bmatrix} \tag{1}$$

Figure 1:
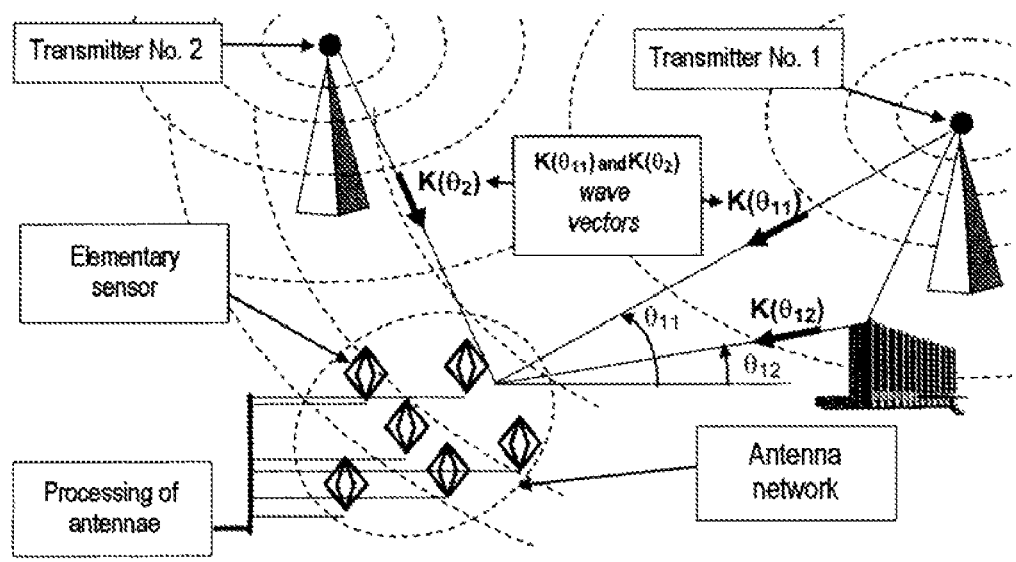
FIG. 1, an example of signals transmitted by a transmitter and being propagated to a sensor network, FIG. 2, the presentation of the incidence of a source on a sensor plane, FIG. 3, the propagation of multipath signals, FIG. 4, an example of position sensor networks $(x_n, y_n)$, FIG. 5, a network of sensors consisting of two subnetworks that do not vary by translation, FIG. 6, the length of interpolation with modal functions according to the ratio $R/\lambda$ of the network, FIG. 7, the amplitude error for $R/\lambda=0.5$ where $\delta\theta=50°$, FIG. 8, the interpolation according to the invention on two angular sectors, FIG. 9, a zone of interpolation on two sectors, FIG. 10, the complete meshing of the space for the calculation of the matrices Wjk.
Figure 2:
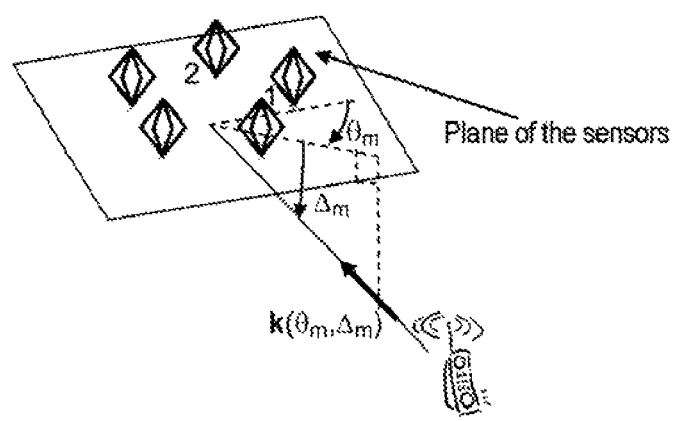
Figure 3:
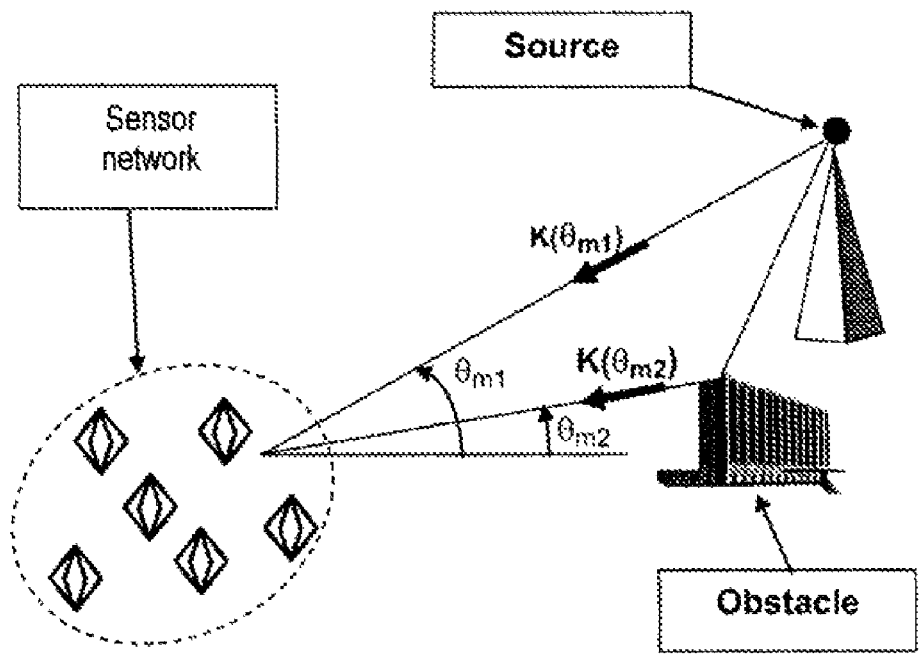
Figure 4:
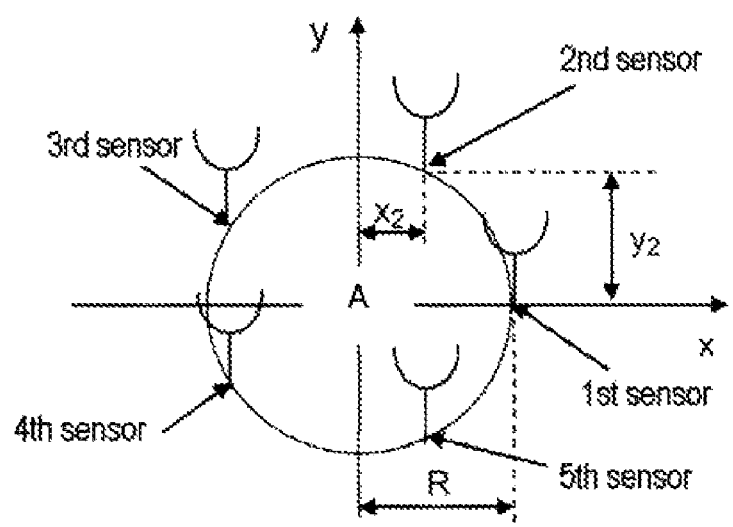

-continued $$= \sum_{m=1}^{M} \sum_{p=1}^{P_m} \rho_{mp} a(\theta_{mp}) s_m(t - \tau_{mp}) + n(t)$$

$$= As(t) + n(t).$$

where $x_n(t)$ is the output signal of the nth sensor, $A=[A_1 \ldots A_M]$, $A_m=[a(\theta_{m1}) \ldots a(\theta_{mP_m})]$, $s(t)=[s_1(t)^T \ldots s_M(t)^T]^T$, $s_m(t)=[s_m(t-\tau_{m1}) \ldots s_m(t-\tau_{mP_m})]^T$, $n(t)$ is the additional noise, $a(\theta)$ is the response of the sensor network to a source of direction $\theta$ and $\rho_{mp}$, $\theta_{mp}$, $\tau_{mp}$ are respectively the attenuation, the direction and the delay of the pth paths of the mth source. The vector $a(\theta)$ which is also called the steering vector depends on the positions $(x_n, y_n)$ of the sensors (see FIG. 4) and is written:

$$a(\theta) = \begin{bmatrix} a_1(\theta) \\ \vdots \\ a_N(\theta) \end{bmatrix} \text{ with } a_n(\theta) = \exp\left(j\frac{2\pi}{\lambda}(x_n\cos(\theta) + y_n\sin(\theta))\right). \tag{2}$$

where $\lambda$ is the wavelength and R the radius of the network. In the case of an equally spaced linear network, the vector $a(\theta)$ is written:

$$a(\theta) = \begin{bmatrix} 1 \\ z_{Lin}(\theta) \\ \vdots \\ z_{Lin}(\theta)^{N-1} \end{bmatrix} \text{ with } z_{Lin}(\theta) = \exp\left(j2\pi\frac{d}{\lambda}\sin(\theta)\right). \tag{3}$$

where d is the distance between sensors.

In the presence of coherent paths, the delays verify $\tau_{m1} = \ldots = \tau_{mP_m}$. In these conditions, the signal model of the equation (1) becomes:

$$x(t) = \sum_{m=1}^{M} a(\theta_m, \rho_m) s_m(t) + n(t) \text{ with } a(\theta_m, \rho_m) = \sum_{p=1}^{r_m} \rho_{mp} a(\theta_{mp}). \tag{4}$$

where $a(\theta_m, \rho_p)$ is the response of the sensor network to the mth source, $\theta_m = [\theta_{m1} \ldots \theta_{mP_m}]^T$ and $\rho_m = [\rho_{m1} \ldots \rho_{mP_m}]^T$. The steering vector of the source is no longer $a(\theta_{m1})$ but a composite steering vector $a(\theta_m, \rho_m)$ which is different and which depends on a number of more important parameters.

A Problem with the Algorithms of the Prior Art in the Presence of Coherent Sources The algorithm MUSIC [1] is a high-resolution method based on the breaking down into elements specific to the matrix of covariance $R_x=E[x(t) x(t)^H]$ of the multisensor signal $x(t)$ ($E[.]$ is the mathematical hope). According to the model of the equation (1), the expression of the covariance matrix $R_x$ is as follows:

$R_x = AR_sA^H + \sigma^2 I_N$ where $R_sE[s(t) s(t)^H]$ and $E[n(t) n(t)^H] = \sigma^2 I_N$ where $A=[A_1 \ldots A_M]$ and $A_m=[a(\theta_{m1}) \ldots a(\theta_{mP_m})]$ (5).

The alternative to MUSIC for coherent sources is the algorithm of Maximum Likelihood [2][3] which requires the optimization of a multidimensional criterion depending on the incoming directions $\theta_{mp}$ of each of the paths. The latter estimate $\theta_{mp}$ for $(1 \leq m \leq M)$ and $(1 \leq p \leq P_m)$ of a criterion with $K = \sum_{m=1}^{M} P_m$ dimensions requires a high calculation cost.

Spatial Smoothing Techniques

The object of spatial smoothing techniques is notably to apply a preprocess to the covariance matrix $R_x$ of the multi-sensor signal which increases the rank of the covariance matrix $R_s$ of the sources in order to be able to apply algorithms of the MUSIC type or any other algorithm having equivalent functionalities in the presence of coherent sources without needing to apply an algorithm of the maximum likelihood type.

Figure 5:
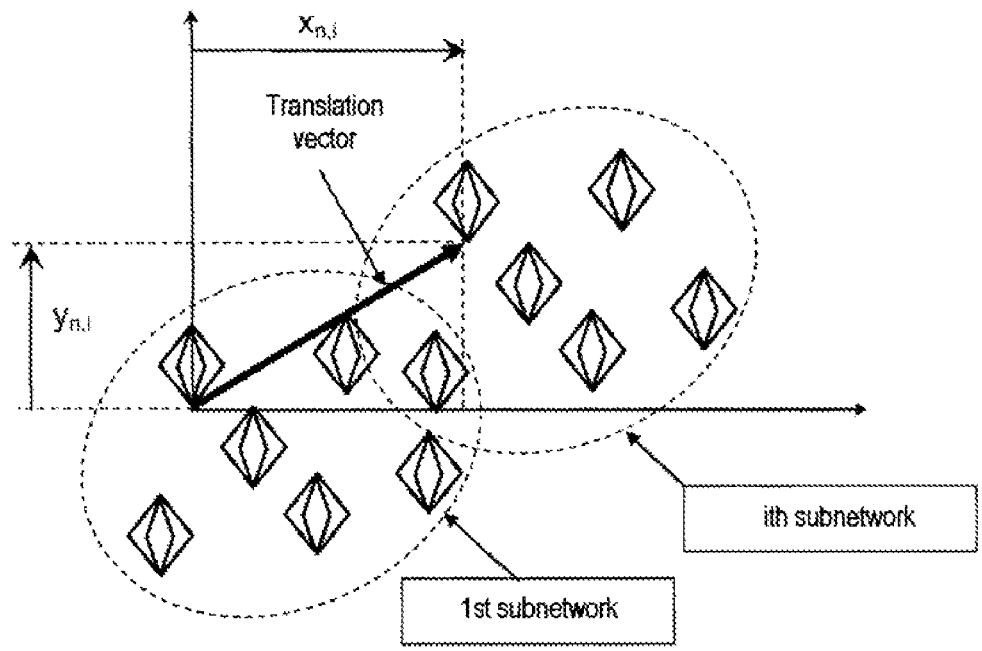
Figure 6:
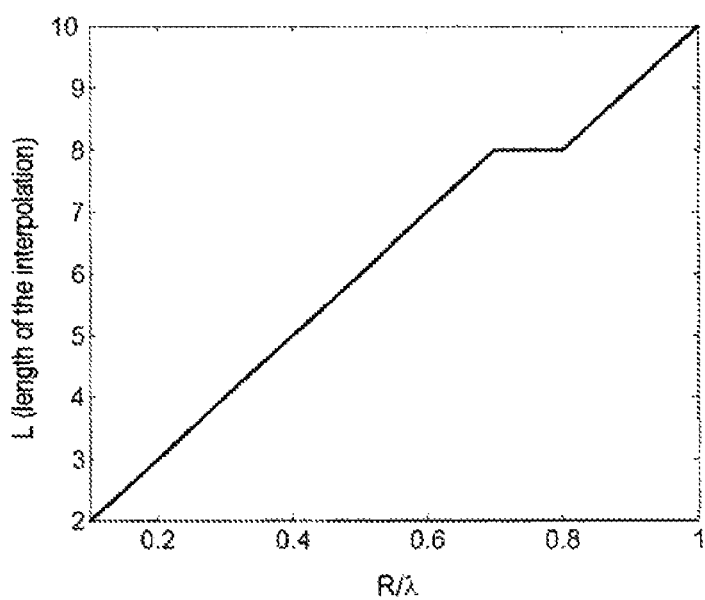

When a sensor network contains invariant subnetworks by translation as in FIG. 5, the spatial smoothing techniques [4][5] can then be envisaged. In this case, the signal received on the ith subnetwork is written:

$$x^i(t) = \sum_{m=1}^{M} \sum_{p=1}^{P_m} \rho_{mp} a^i(\theta_{mp}) s_m(t - \tau_{mp}) + n(t) = A^i s(t) + n(t) \qquad (6)$$

where $a_i(\theta)$ is the steering vector of this subnetwork which has the particular feature of verifying:

$$a^i(\theta) = \alpha^i(\theta) a^1(\theta) \text{ with } \alpha^i(\theta) = \exp\left(j\frac{2\pi}{\lambda}(x_{n,i}\cos(\theta) + y_{n,i}\sin(\theta))\right) \qquad (7)$$

The mixed matrix $A_i$ of the equation (6) is then written $$A^i = A^1 \Phi_i \text{ with } \Phi_i = \text{diag}\{\alpha^i(\theta_{11}) \ldots \alpha^i(\theta_{1P_1}) \ldots \alpha^i(\theta_{M1}) \ldots \alpha^i(\theta_{MP_M})\} \qquad (8)$$

Knowing that $A^i = [A_1^i \ldots A_M^i]$ and $A_m^i = [a^i(\theta_{m1}) \ldots a^i(\theta_{mP_m})]$. In the case of the linear network of the equation (3) this gives $$x^i(t) = \begin{bmatrix} x_i(t) \\ \vdots \\ x_{i+N'}(t) \end{bmatrix} \text{ with } a^1(\theta) = \begin{bmatrix} 1 \\ z_{Lin}(\theta) \\ \vdots \\ z_{Lin}(\theta)^{N'-1} \end{bmatrix} \text{ and } \alpha^i(\theta) = z(\theta)^i \qquad (9)$$

The smoothing technique is based on the structure of the covariance matrix $R_x^i = E[x(t)^i x(t)^{iH}]$ which, according to (6) (8), is written as follows:

$$R_x^i = A^1 \Phi_i R_s \Phi_i^* A^{1H} + \sigma^2 I_N \qquad (10)$$

The spatial smoothing technique therefore makes it possible to apply a goniometry algorithm like the MUSIC algorithm on the following covariance matrix:

$$R_x^{SM} = \sum_{i=1}^{I} R_x^i \qquad (11)$$

where I is the number of subnetworks. Specifically this technique makes it possible to decorrelate to the maximum I coherent paths because $$R_x^{SM} = A^1 R_s^{SM} A^{1H} + \sigma^2 I_{N'} \text{ where } R_s^{SM} = \sum_{i=1}^{I} \Phi_i R_s \Phi_i^* \qquad (12)$$

and thus rank $\{R_s\} \leq$ rank $\{R_s^{SM}\} \leq \min(I \times \text{rank } \{R_s\}, \Sigma_{m=1}^{M} P_m)$.

The Forward-Backward spatial smoothing technique [4] requires a sensor network having a center of symmetry. In these conditions, the steering vector verifies:

$$\tilde{a}(\theta) = Za(\theta)^* = \beta(\theta)a(\theta) \text{ with } Z = \begin{bmatrix} 0 & 0 & 1 \\ 0 & \cdot^{\cdot} & 0 \\ 1 & 0 & 0 \end{bmatrix} \qquad (13)$$

The linear network of the equation (3) verifies this condition with $\beta(\theta) = z_{Lin}(\theta)^{-N}$.

The Forward-Backward smoothing technique consists in applying a goniometry algorithm such as MUSIC on the following covariance matrix:

$$R_x^{FB} = R_x + ZR_x^* Z^T \qquad (14)$$

This technique makes it possible to decorrelate up to 2 coherent paths because $$R_x^{FB} = AR_s^{FB} A^H + \sigma^2 I_N \text{ where } R_s^{FB} = R_s + \Phi_{FB} R_s \Phi_{FB}^* \qquad (15)$$

Thus rank $\{R_s\} \leq$ rank $\{R_s^{SM}\} \leq \min(2 \times \text{rank } \{R_s\}, \Sigma_{m=1}^{M} P_m)$ with $$\Phi_{FB} = \text{diag}\{\beta(\theta_{11}) \ldots \beta(\theta_{1P_1}) \ldots \beta(\theta_{M1}) \ldots \beta(\theta_{MP_M})\} \qquad (16)$$

The spatial and Forward-Backward smoothing techniques may be combined to increase the decorrelation capacity in number of paths. These smoothing techniques make it possible to process the coherent sources with a calculation cost close to the MUSIC method. However, these techniques require geometries of sensor networks that are very particular. It should be noted that these particular network geometries are virtually impossible to design in the presence of mutual coupling between the sensors or of coupling with the carrying structure of the sensor network.

Interpolation Techniques of a Sensor Network

As has been explained above, there are goniometry techniques of coherent sources with low calculation cost on particular networks. The object of the present invention relates notably to applying these techniques to networks with non-uniform geometry. For this, it is necessary to achieve transformations of the steering vector $a(\theta)$ in order to obtain the remarkable properties of the equations (7) and/or (13). These transformations are achieved by a process of interpolation according to the invention comprising the steps described below which are illustrative and in no way limiting. The transformation takes place, for example, by applying an interpolation matrix to the sensor signals (signals received by the sensors of a network) and makes it possible to obtain an equivalent steering vector $e(\theta)$ which verifies the remarkable properties of the equations (7) and/or (13).

The invention also relates to a method making it possible to interpolate steering vectors, vectors dependent on the positions of the sensors of a network that receives signals.

Interpolation with Modal Functions

In order to achieve an interpolation with an omnidirectional function in $\theta$, where $\theta$ corresponds to the direction of a transmitting source, the method uses modal functions $z(\theta)^k$ where $z(\theta) = \exp(j\theta)$, for example. The interpolation function of the steering vector may be expressed in the following form:

$$a(\theta) \approx We(\theta) \text{ with } e(\theta) = \begin{bmatrix} z(\theta)^{-L} \\ \vdots \\ z(\theta)^L \end{bmatrix} \qquad (17)$$

-continued $$= \begin{bmatrix} \exp(-jL\theta) \\ \vdots \\ \exp(jL\theta) \end{bmatrix} \text{ for } 0 \le \theta < 360°$$

The matrix W of dimension N×(2L+1), not necessarily square, is obtained by minimizing in the sense of least squares the deviation $\|a(\theta)-We(\theta)\|^2$ for azimuths verifying $0 \le \theta < 360°$. The length of the interpolation 2L+1 depends on the aperture of the network. The parameter L is determined, for example, based on the following amplitude error criterion:

$$\text{A\_dB}(a(\theta), We(\theta)) = \max_{\theta,n}\left\{20\log_{10}\left(\left|\frac{a_n(\theta)}{\hat{a}_n(\theta)}\right|\right)\right\} \text{ with } We(\theta) \quad (18)$$

$$= \begin{bmatrix} \hat{a}_1(\theta) \\ \vdots \\ \hat{a}_N(\theta) \end{bmatrix}$$

where L is the minimal value verifying A_dB less than 0.1 dB. Specifically, A_dB is zero when the interpolation is perfect and therefore when $a(\theta)=We(\theta)$. This value is associated with a phase error of 0.7° which corresponds to an uncertainty on the measurement of the steering vectors $a(\theta)$ during a calibration phase. In the particular case of a circular network with radius R with N=5 sensors where $$a(\theta) = \begin{bmatrix} a_1(\theta) \\ \vdots \\ a_N(\theta) \end{bmatrix} \text{ with } a_n(\theta) = \exp\left(j2\pi\frac{R}{\lambda}\cos\left(\theta - 2\pi\left(\frac{n-1}{N}\right)\right)\right). \quad (19)$$

Figure 7:
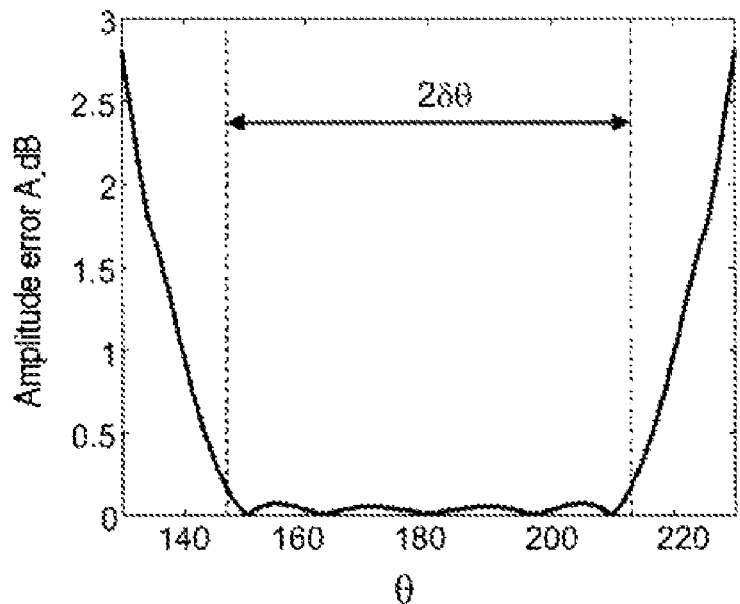

The dependence between the parameter L of the interpolation and the ratio R/λ is illustrated in FIG. 7. This FIG. 7 shows that a network with a radius R requires $2L+1=21/\lambda$ coefficients for an interpolation on 360°.

In the presence of M sources with $P_m$ multipaths for the mth source, the signal of the equation (1) is written as follows:

$$x(t) = \sum_{m=1}^{M}\sum_{p=1}^{P_m} \rho_m \tilde{a}(\theta_{mp})s_m(t-\tau_{mp}) + n(t) \quad (20)$$

$$= \tilde{A}s(t) + n(t) \text{ with } \tilde{a}(\theta) = We(\theta) \text{ and } \tilde{A}$$

$$= WE$$

where $E=[E_1 \ldots E_M]$ and $E_m=[e(\theta_{m1}) \ldots e(\theta_{mP_m})]$. The latter expression is written:

$$x(t)=Wy(t)+n(t) \text{ where } y(t)=Es(t) \quad (21)$$

where the relation between x(t) and y(t) is linear.

Adaptation of Spatial Smoothing to Interpolated Networks by Modal Functions

The methods of the MUSIC [1] or ESPRIT type are based on the model of the equations (1) (20). In the problem of interpolation of a network by modal functions, two cases are envisaged:

N≧2L+1: The signal y(t) can be directly obtained from the signal x(t) by carrying out: $y(t)=(W^H W)^{-1} W^H x(t)$. All the algorithms adapted to the linear network can be applied to the signal y(t): it is therefore possible to apply a spatial smoothing technique in order to decorrelate the multipaths, as described, for example, above.

N<2L+1: The signal y(t) cannot be directly obtained from x(t). The algorithms that can be applied to linear networks are no longer directly applicable; the method according to the invention proposes a method making it possible to remedy this problem.

Processing the Case in which N<2L+1

Since the matrix W contains fewer lines than columns, it is envisaged in this method to interpolate the network by K sectors of width $\delta\theta=180/K$ with square interpolation matrices $W_k$ where $$a(\theta) = W_k e(\theta) \text{ with } e(\theta) = \begin{bmatrix} \exp(-jL_0\theta) \\ \vdots \\ \exp(jL_0\theta) \end{bmatrix} \text{ for } |\theta-\theta_k| < \delta\theta \quad (22)$$

where the K matrices $W_k$ are squared with $N=2L_0+1$ and $W_k e(\theta)$ is the interpolation function on a sector. Note that $a(\theta) \ne W_k e(\theta)$ for $|\theta-\theta_k| \ge \delta\theta$. The matrices $W_k$ are obtained by minimizing the deviation $\|a(\theta)-W_k e(\theta)\|^2$ in the sense of the least squares the deviation for $|\theta-\theta_k|<\delta\theta$. The width of the interpolation cone $\delta\theta$ is determined based on the following amplitude error criterion:

$$\text{A\_dB}(a(\theta), W_k e(\theta)) = \quad (23)$$

$$\max_{\theta_k-\delta\theta \le \theta \le \theta_k+\delta\theta,n}\left\{20\log_{10}\left(\left|\frac{a_n(\theta)}{\hat{a}_n(\theta)}\right|\right)\right\} \text{ with } W_k e(\theta) = \begin{bmatrix} \hat{a}_1(\theta) \\ \vdots \\ \hat{a}_N(\theta) \end{bmatrix}$$

where δθ is the minimal value verifying that A_dB is less than 0.1 dB because A_dB is zero when $a(\theta)=W_k e(\theta)$. Returning to the circular network of the equation (19), the width of interpolation δθ depends in the following manner on the ratio R/λ and on the number K=180/δθ of sectors (Table 1 which gives the width of the interpolation cone as a function of R/λ with A_dB=0.1).

TABLE 1

| R/λ | δθ | K |
|---|---|---|
| 0.1000 | 180.0000 | 1 |
| 0.1200 | 180.0000 | 1 |
| 0.1400 | 96.0000 | 2 |
| 0.1500 | 90.0000 | 2 |
| 0.2000 | 70.0000 | 3 |
| 0.3000 | 50.0000 | 4 |
| 0.4000 | 37.0000 | 5 |
| 0.5000 | 33.0000 | 6 |
| 0.6000 | 25.0000 | 7 |
| 0.7000 | 21.0000 | 8 |
| 0.8000 | 18.5000 | 9 |

FIG. 7 represents the amplitude error $$\text{A\_dB}(\theta) = \max_n\{|20\log_{10}(|a_n(\theta)/\hat{a}_n(\theta)|)|\}$$

for R/λ=0.5 and shows that A_dB(θ) is markedly less than 0.1 dB for |θ−180°|<33°.

According to a variant embodiment of the method, a spatial smoothing technique is applied to an interpolated network by sector. Thus the following vector:

$$\hat{e}(\theta) = W_k^{-1} a(\theta) = \begin{bmatrix} \hat{e}_1(\theta) \\ \vdots \\ \hat{e}_N(\theta) \end{bmatrix} \approx \begin{bmatrix} \exp\left(-j\frac{N}{2}\theta\right) \\ \vdots \\ \exp\left(j\frac{N}{2}\theta\right) \end{bmatrix} \quad (24)$$

must verify the properties of the equations (7) (13) for all the incidences $\theta_{mp}$ of the coherent sources of the equation (1). In consequence by posing $$\hat{e}^k(\theta) = \begin{bmatrix} \hat{e}_k(\theta) \\ \vdots \\ \hat{e}_{i+N'}(\theta) \end{bmatrix} \approx \exp(jk\theta) \begin{bmatrix} \exp\left(-j\frac{N}{2}\theta\right) \\ \vdots \\ \exp\left(j\left(-\frac{N}{2}+1+N'\right)\theta\right) \end{bmatrix} \quad (25)$$

the incidences of the coherent sources must verify $$\hat{e}^k(\theta_{mp}) = \alpha^k(\theta_{mp})\hat{e}^1(\theta_{mp}) \text{ with } \alpha^k(\theta) = \exp(jk\theta) \quad (26)$$

and/or verify that $$\hat{e}(\theta_{mp}) = Z\hat{e}(\theta_{mp}) = \beta(\theta_{mp})\hat{e}(\theta_{mp}) \text{ with } \beta(\theta) = 1 \quad (26)$$

The conditions of the equations (26) (27) are valid only when the incidences $\theta_{mp}$ of the coherent sources are in the same sector of interpolation by verifying: $|\theta_{mp} - \theta_k| < \delta\theta$. In consequence, the method processes the following two situations:

The coherent sources are in the same sector of interpolation
The coherent sources are in different sectors of interpolation.

In order to process the situations of coherent sources present in different sectors, it is envisaged, by using the method according to the invention, to interpolate jointly the steering vector $a(\theta)$ over several sectors.

Joint Interpolation Over P=2 Sectors.

Figure 8:
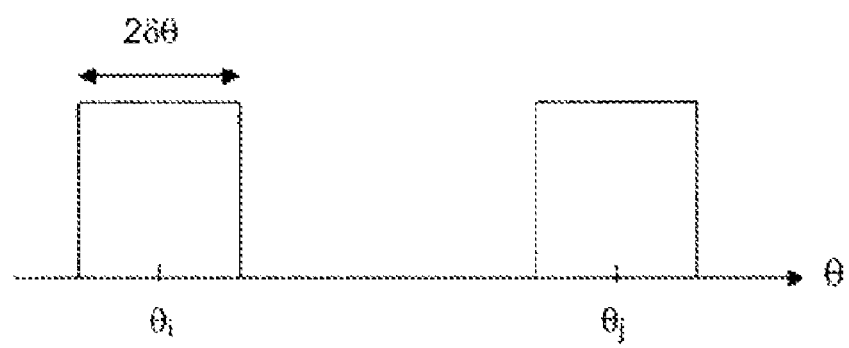
Figure 9:
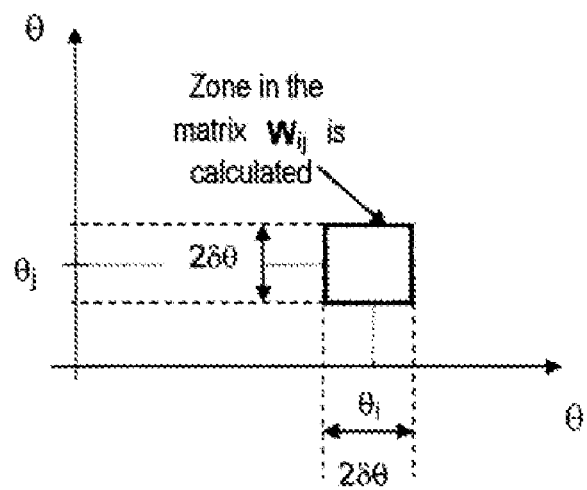
Figure 10:
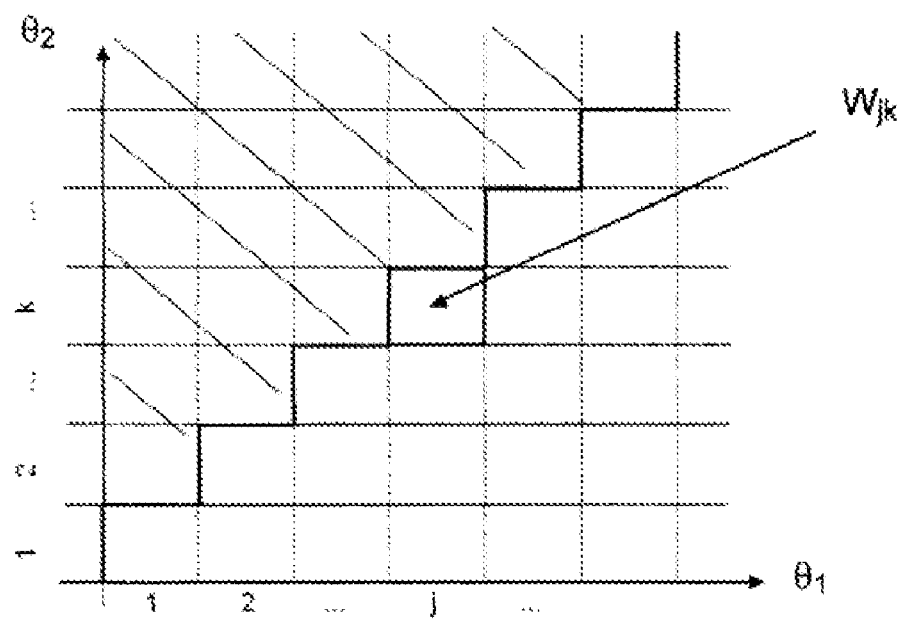

Joint interpolation over P=2 sectors of width $\delta\theta$ is carried out with the square interpolation matrix $W_{ij}$ where $$a(\theta) = W_{ij} e(\theta) \text{ with} \quad (28)$$

$$e(\theta) = \begin{bmatrix} \exp(-jL_0\theta) \\ \vdots \\ \exp(jL_0\theta) \end{bmatrix} \text{ for } |\theta - \theta_i| < \delta\theta \text{ and } |\theta - \theta_j| < \delta\theta$$

where the matrix $W_{ij}$ has the dimension N×N with $N=2L_0+1$ and the intervals $|\theta-\theta_i|<\delta\theta$ and $|\theta-\theta_j|<\delta\theta$ are disjointed (see FIG. 8 and FIG. 9). $W_{ij} e(\theta)$ is the interpolation function of the steering vector $a(\theta)$ over two sectors because $a(\theta) \neq W_{ij} e(\theta)$ when $|\theta-\theta_j| \geq \delta\theta$ or $|\theta-\theta_j| \geq \delta\theta$. The matrices $W_{ij}$ are obtained by minimizing the deviation $\|a(\theta)-W_{ij}e(\theta)\|^2$ in the direction of the least squares for $|\theta-\theta_i|<\delta\theta$ and $|\theta-\theta_j|<\delta\theta$. The width of the interpolation cone $\delta\theta$ is determined based on $$A\_dB(a(\theta), W_{ij} e(\theta)) = \quad (29)$$

$$\max_{|\theta-\theta_i|<\delta\theta, |\theta-\theta_j|<\delta\theta, n} \left\{ 20 \log_{10}\left(\left|\frac{a_n(\theta)}{\hat{a}_n(\theta)}\right|\right) \right\} \text{ with } W_{ij} e(\theta) = \begin{bmatrix} \hat{a}_1(\theta) \\ \vdots \\ \hat{a}_N(\theta) \end{bmatrix}$$

where $\delta\theta$ is the minimal value for which the amplitude error A_dB is less than 1 dB. Knowing that $W_{ij}=W_{ji}$, the number of matrices $W_{ij}$ necessary is (K×(K+1)/2 with K=90/$\delta\theta$ (see FIG. 10). Returning to the circular network of the equation (19), the width of interpolation $\delta\theta$ and the number of sectors ij ((K×(K+1))/2) depend on the ratio R/$\lambda$ according to Table 2 which contains the width of the P=2 disjointed sectors of interpolation according to R/$\lambda$ with A_dB=1

TABLE 2

| R/λ | δθ | K | Number of sectors ij (K × (K + 1))/2 |
|---|---|---|---|
| 0.1000 | 45.0000 | 1 | 1 |
| 0.1200 | 45.0000 | 1 | 1 |
| 0.1400 | 45.0000 | 1 | 1 |
| 0.1500 | 45.0000 | 1 | 1 |
| 0.2000 | 45.0000 | 1 | 1 |
| 0.3000 | 31.0000 | 3 | 6 |
| 0.4000 | 22.0000 | 4 | 10 |
| 0.5000 | 15.0000 | 6 | 21 |
| 0.6000 | 14.0000 | 7 | 28 |
| 0.7000 | 14.0000 | 7 | 28 |
| 0.8000 | 14.0000 | 7 | 28 |

The width of the interpolation cone $\delta\theta$ may also be established by taking account of the spatial smoothing technique requiring the relation of the equation (24) (25) (26). Taking $N'=N-1$, the width of the cone $\delta\theta$ is determined based on:

$$A\_dB\left(\hat{e}^1(\theta), \hat{e}^2(\theta)\right) = \quad (30)$$

$$\max_{|\theta-\theta_i|<\delta\theta, |\theta-\theta_j|<\delta\theta, n} \left\{ 20 \log_{10}\left(\left|\frac{\hat{e}_n(\theta)}{\hat{e}_{n+1}(\theta)}\right|\right) \right\} \text{ with } W_k^{-1} a(\theta) = \begin{bmatrix} \hat{e}_1(\theta) \\ \vdots \\ \hat{e}_N(\theta) \end{bmatrix}$$

where $\delta\theta$ is the minimal value for which the amplitude error A_dB is less than 1 dB.

TABLE 3

Width of the P = 2 disjointed sectors of interpolation for spatial smoothing according to R/λ with A_dB = 1

| R/λ | δθ | K | Number of sectors ij (K × (K + 1))/2 |
|---|---|---|---|
| 0.1000 | 45.0000 | 1 | 1 |
| 0.1200 | 45.0000 | 2 | 3 |
| 0.1400 | 45.0000 | 2 | 3 |
| 0.1500 | 45.0000 | 2 | 3 |
| 0.2000 | 40.0000 | 3 | 6 |
| 0.3000 | 30.0000 | 3 | 6 |
| 0.4000 | 14.0000 | 7 | 28 |
| 0.5000 | 12.0000 | 7 | 28 |
| 0.6000 | 12.0000 | 7 | 28 |
| 0.7000 | 12.0000 | 7 | 28 |
| 0.8000 | 12.0000 | 7 | 28 |

Therefore, in the presence of a maximum of P=2 coherent sources the following transformation on the signal of the equation (1) is carried out in each sector $|\theta-2i\times\delta\theta|<\delta\theta$ and $|\theta-2j\times\delta\theta|<\delta\theta$:

$$y^{ij}(t) = W_{ij}^{-1} x(t) \quad (31)$$

Which is also written:

$$y^{ij}(t) = \sum_{m=1}^{M} \sum_{p=1}^{P_m} \rho_{mp} \hat{e}(\theta_{mp}) s_m(t - \tau_{mp}) + n(t) = \quad (32)$$

$$Es(t) + n(t) \text{ with } \hat{e}(\theta) = \begin{bmatrix} \exp(-jL_0\theta) \\ \vdots \\ \exp(jL_0\theta) \end{bmatrix} \text{ when } |\theta - 2i \times \delta\theta| <$$

$$\delta\theta \text{ and } |\theta - 2j \times \delta\theta| < \delta\theta$$

where $E=[E_1 \ldots E_M]$ and $E_m=[\hat{e}(\theta_{m1}) \ldots \hat{e}(\theta_{mP_m})]$. All the algorithms adapted to the linear network can be applied to the signal $y^{ij}(t)$: a spatial smoothing technique may be used to decorrelate the coherent multipaths in the interval $|\theta-2i\times\delta\theta|<\delta\theta$ and $|\theta-2j\times\delta\theta|<\delta\theta$ and then apply a goniometry algorithm such as ESPRIT. However, only the estimates $\hat{\theta}_{mp}$ verifying $|\hat{\theta}_{mp}-2i\times\delta\theta|<\delta\theta$ and $|\hat{\theta}_{mp}-2j\times\delta\theta|<\delta\theta$ are solutions. To obtain all of the estimates, it is necessary to apply spatial smoothing and a goniometry in all the sectors with indices (i,j) for $0 \leq i \leq j \leq 180/\delta\theta$.

Joint Interpolation on P Sectors.

Joint interpolation on P sectors of width $\delta\theta$ is carried out with the interpolation matrix $W_{i_1 \ldots i_P}$ squares where $$a(\theta) = W_{i_1 \ldots i_P} e(\theta) \text{ with} \quad (33)$$

$$e(\theta) = \begin{bmatrix} \exp(-jL_0\theta) \\ \vdots \\ \exp(jL_0\theta) \end{bmatrix} \text{ for } |\theta - \theta_{i_p}| < \delta\theta \text{ and } 1 \leq p \leq P$$

where $W_{i_1 \ldots i_P} e(\theta)$ corresponds to an interpolation function ($a(\theta) \neq W_{i_1 \ldots i_P} p\, e(\theta)$ when $|\theta-\theta_{i_p}|<\delta\theta$ for $1 \leq p \leq P$ is not verified),
where the matrix $W_{i_1 \ldots i_P}$ is squared with $N=2L_0+1$ and the intervals $|\theta-\theta_{i_p}|<\delta\theta$ and $1 \leq p \leq P$ are disjointed. The interpolation matrices $W_{i_1 \ldots i_P}$ are obtained by minimizing the deviation $\|a(\theta)-W_{i_1 \ldots i_P}e(\theta)\|^2$ in the sense of the least squares the deviation for $|\theta-\theta_{i_p}|<\delta\theta$ and $1 \leq p \leq P$. The width of the interpolation cone $\delta\theta$ is determined based on $$A\_dB(\hat{e}^1(\theta), \hat{e}^2(\theta)) = \max_{|\theta-\theta_{i_p}|<\delta\theta \text{ for } 1\leq p\leq P, n} \left\{20 \log_{10}\left(\left|\frac{\hat{e}_n(\theta)}{\hat{e}_{n+1}(\theta)}\right|\right)\right\} \quad (34)$$

$$\text{with } W_{i_1 \ldots i_P}^{-1} a(\theta) = \begin{bmatrix} \hat{e}_1(\theta) \\ \vdots \\ \hat{e}_N(\theta) \end{bmatrix}$$

where $\delta\theta$ is the minimal value for which the amplitude error A_dB is less than a value A_dB_ref. Typically A_dB_ref is 1 dB. The steps for evaluating the interpolation matrices $W_{i_1 \ldots i_P}$ and the width of interpolation $\delta\theta$ of each sector are as follows.

Step No. A.1: $\delta\theta=180°/P$ and $\theta_{i_p}=2\delta\theta(p-1)$ for $1 \leq p \leq P$
Step No. A.2: Calculation of the matrix $W_{i_1 \ldots i_P}$ by minimizing in the sense of the mean squares $\|a(\theta)-W_{i_1 \ldots i_P} e(\theta)\|^2$ for $|\theta-\theta_{i_p}|<\delta\theta$ and $1 \leq p \leq P$.
Step No. A.3: Calculation of the criterion A_dB($\hat{e}^1(\theta),\hat{e}^2(\theta)$) of the equation (34).
Step No. A.4: If A_dB($\hat{e}^1(\theta),\hat{e}^2(\theta)$)>A_dB_ref then $\delta\theta=\delta\theta/2$ and return to step A.2

Step No. A.5: Calculation of $K=180/(P\delta\theta)$
Step No. A.6: For all P-uplets $(i_1 \ldots i_P)$ verifying $0 \leq i_1 \leq \ldots \leq i_P < K$:
Step No. A.6.1: Calculation of the $\theta_{i_p}=2\delta\theta \times i_P$ for $1 \leq p \leq P$
Step No. A.6.2: Calculation of the matrix $W_{i_1 \ldots i_P}$ by minimizing in the sense of the mean squares $\|a(\theta)-W_{i_1 \ldots i_P}e(\theta)\|^2$ for $|\theta-\theta_{i_p}|<\delta\theta$ and $1 \leq p \leq P$.
Step No. A.6.3: Return to step A.6.1 if all the P-uplets $(i_1 \ldots i_P)$ verifying $1 \leq i_1 \leq \ldots \leq i_P \leq K$ are not explored.

The steps for carrying out the goniometry with an interpolation on P sectors use the interpolation matrices calculated during the steps A. The steps of the goniometry are then as follows:

Step No. B.0: Initialization of the assembly $\Theta$ at $\emptyset$
Step No. B: For all P-uplets $(i_1 \ldots i_P)$ verifying $0 \leq i_1 \leq \ldots i_P < K$:
Step No. B.1: Calculation of $y^{i_1 \ldots i_P}(t) = W_{i_1 \ldots i_P}^{-1} x(t)$
Step No. B.2: Calculation of $\theta_{i_p}=2\delta\theta \times i_P$ for $1 \leq p \leq P$
Step No. B.3: Application of a spatial and/or Forward-Backward smoothing technique to the observation $y^{i_1 \ldots i_P}(t)$ then application of a goniometry of the ESPRIT type in order to obtain the incidences $\hat{\theta}_k$ for $1 \leq k \leq K_{i_1 \ldots i_P}$.
Step No. B.4: Selection of the estimated incidences $\hat{\theta}_k \in \Theta_{i_1 \ldots i_P}$ where $\Theta_{i_1 \ldots i_P} = \{|\hat{\theta}_k-\theta_{i_p}|<\delta\theta \text{ for } 1 \leq p \leq P \text{ and } J_{MUSIC}(\hat{\theta})<\eta\}$ according to the following MUSIC[1] criterion in which $$J_{MUSIC}(\theta) = \frac{a(\theta)^H \Pi_b a(\theta)}{a(\theta)^H a(\theta)} \quad (35)$$

where $\Pi_b$ is the noise projector extracted from the covariance matrix $R_x$ (the equation (7) forms part of the passage in orange that has been deleted). Hence the proposition; according to a known equation of the methods of goniometry of the MUSIC type. (The threshold $\eta$ is chosen typically at 0.1.)

Step No. B.5: $\Theta = \Theta \cup \Theta_{i_1 \ldots i_P}$ assemblies of the angles of incidence verifying the step B.4 for all the sectors associated with the P-uplets $(i_1 \ldots i_P)$ processed by the algorithm.
Step No. B.6: Return to step No. B.1 so long as all the P-uplets $(i_1 \ldots i_P)$ verifying $0 \leq i_1 \leq \ldots \leq i_P < K$ are not explored.

BIBLIOGRAPHY

[1] R O. SCHMIDT, *Multiple emitter location and signal parameter estimation*, in Proc of the RADC Spectrum Estimation Workshop, Griffiths Air Force Base, New York, 1979, pp. 243-258.

[2] (M V) P. Larzabal *Application du Maximum de vraisemblance au traitement d'antenne: radio-goniométrie et poursuite de cibles*. PhD Thesis, Université de Paris-sud, Orsay, FR, June 1992

[3] (M V) B. Ottersten, M. Viberg, P. Stoica and A. Nehorai *Exact and large sample maximum likelihood techniques for parameter estimation and detection in array processing*. In S. Haykin, J. Litva and T J. Shephers editors, Radar Array Processing, chapter 4, pages 99-151. Springer-Verlag, Berlin 1993.

[4] (SMOOTH) S. U. Pillai and B. H. Kwon, *Forward/backward spatial smoothing techniques for coherent signal identification*, IEEE Trans. Acoust., Speech and Signal Processing, vol. 37, pp. 8-15, January 1988

[5] (SMOO-INTER) B. Friedlander and A. J. Weiss. *Direction Finding using spatial smoothing with interpolated arrays*. IEEE Transactions on Aerospace and Electronic Systems, Vol. 28, No. 2, pp. 574-587, 1992.
[6] (INTER) T. P. Bronez, Sector interpolation of nonuniform arrays for efficient high resolution bearing estimation, in *Proc. IEEE ICASSP '88*, vol. 5, pp. 2885-2888, New York, N.Y., April 1988
[7] (MODE) Y. Bresler and A. Macovski, *Exact Maximum Likelihood Parameter Estimation of Superimposed Exponential Signals in Noise*, IEEE Trans. on ASSP, 34(5):1081-1089, October 1986
[8] (MODE) Stoica P, Sharman K C. *Maximum likelihood methods for direction-of-arrival estimation*. IEEE Transactions on Acoustics, Speech and Signal Processing, 38:1132-1143, July 1990
[9] (ESPRIT) R. Roy and T. Kailath, *ESPRIT—Estimation of signal parameters via, rotational invariance techniques*, IEEE Trans. Acoust. Speech, Signal Processing, Vol 37, pp 984-995, July 1989.
[10] (ESPRIT) K. T. Wong and M. Zoltowski, *Uni-Vector Sensor ESPRIT for Multi-Source Azimuth-Elevation Angle Estimation*, Digest of the 1996 IEEE International Antennas and Propagation Symposium, Baltimore, Md., Jul. 21-26, 1996, pp. 1368-1371.
[11] (ROOT-INTER) B. Friedlander. *The Root-MUSIC algorithm for direction finding with interpolated arrays*. European J. (Elsevier) Signal Processing, Vol. 30, pp. 15-29, 1993.
[12] (ROOT) K. T. Wong and M. Zoltowski, *Source Localization by 2-D Root-MUSIC with "Scalar Triads" of Velocity Hydrophones*, Conference Record of the Midwest Symposium on Circuits and Systems, Aug. 18-21, 1996.

The invention claimed is:
1. A method for determining the angles of arrivals of coherent sources in a system comprising several nonuniform sensors, the signals being propagated along coherent or substantially coherent paths between a source and said receiving sensors of the network, wherein use is made of at least one modal interpolation function $z(\theta)^k$ that is omnidirectional in azimuth where $z(\theta)=\exp(j\theta)$ with $\theta$ corresponding to an angle sector on which the interpolation of the steering vectors $a(\theta)$ of the sensor network is carried out in order to process the signals transmitted by the sources and received on the sensor network and a spatial smoothing technique is applied in order to decorrelate the coherent sources, the interpolation function $We(\theta)$ is expressed in the following manner:

$$a(\theta) \approx We(\theta) \text{ with } e(\theta) = \begin{bmatrix} z(\theta)^{-L} \\ \vdots \\ z(\theta)^{L} \end{bmatrix} = \begin{bmatrix} \exp(-jL\theta) \\ \vdots \\ \exp(jL\theta) \end{bmatrix} \text{ for } 0 \leq \theta < 360°$$

the matrix $W$ of dimension $N \times (2L+1)$ is obtained by minimizing in the sense of the mean squares the deviation $\|a(\theta)-We(\theta)\|^2$ for azimuths verifying $0 \leq \theta < 360°$, the length of the interpolation $2L+1$ depends on the aperture of the network, and in that the interpolation function comprises several interpolation matrices $W_{i_1 \ldots i_P}$ with P corresponding to the number of disjointed sectors on which the joint interpolation of the received signals is carried out, the determination of the matrix and the width of interpolation $\delta\theta$ of each sector comprising at least the following steps:

Step No. A.1: $\delta\theta = 180°/P$ and $\theta_{i_p} = 2\delta\theta(p-1)$ for $1 \leq p \leq P$
Step No. A.2: Calculate the interpolation matrix $W_{i_1 \ldots i_P}$ by minimizing in the sense of the mean squares $\|a(\theta)-W_{i_1 \ldots i_P}e(\theta)\|^2$ for $|\theta-\theta_{i_p}|<\delta\theta$ and $1 \leq p \leq P$
Step No. A.3: Calculate the criterion $A\_dB(\hat{e}^1(\theta), \hat{e}^2(\theta))$ $$A\_dB(\hat{e}^1(\theta), \hat{e}^2(\theta)) = \max_{|\theta-\theta_{i_P}|<\delta\theta \text{ for } 1\leq p \leq P, n} \left\{ 20\log_{10}\left(\left|\frac{\hat{e}_n(\theta)}{\hat{e}_{n+1}(\theta)}\right|\right) \right\},$$

$$\text{with } W_{i_1 \ldots i_P}^{-1} a(\theta) = \begin{bmatrix} \hat{e}_1(\theta) \\ \vdots \\ \hat{e}_N(\theta) \end{bmatrix}$$

where $\delta\theta$ is the minimal value for which the amplitude error $A\_dB$ is less than a given value $A\_dB\_ref$,
Step No. A.4: If $A\_dB(\hat{e}^1(\theta), \hat{e}^2(\theta)) > A\_dB\_ref$, then do $\delta\theta = \delta\theta/2$ and return to step A.2
Step No. A.5: Calculation of $K = 180/(P\delta\theta)$
Step No. A.6: For all P-uplets $(i_1 \ldots i_P)$ verifying $0 \leq i_1 \leq \ldots \leq i_P < K$ with K being the number of sectors on which the interpolation is carried out:
Step No. A.6.1: Calculation of $\theta_{i_p} = 2\delta\theta \times i_P$ for $1 \leq p \leq P$
Step No. A.6.2: Calculation of the interpolation matrix $W_{i_1 \ldots i_P}$ by minimizing in the sense of the mean squares $\|a(\theta)-W_{i_1 \ldots i_P}e(\theta)\|^2$ for $|\theta-\theta_{i_p}|<\delta\theta$ and $1 \leq p \leq P$
Step No. A.6.3: Return to step A.6.1 if all the P-uplets $(i_1 \ldots i_P)$ verifying $1 \leq i_1 \leq \ldots \leq i_P \leq K$ are not explored.
2. The method as claimed in claim 1, wherein the value of L is determined in the following manner:

$$A\_dB(a(\theta), We(\theta)) = \max_{\theta, n} \left\{ 20\log_{10}\left(\left|\frac{a_n(\theta)}{\hat{a}_n(\theta)}\right|\right) \right\} \text{ with } We(\theta) = \begin{bmatrix} \hat{a}_1(\theta) \\ \vdots \\ \hat{a}_N(\theta) \end{bmatrix}$$

where L is the minimal value verifying $A\_dB$ less than 0.1 dB, wherein $A\_dB$ is zero when the interpolation is perfect and therefore when $a(\theta)=We(\theta)$.
3. The method as claimed in claim 2, wherein, for networks in which the length of the interpolation $2L+1$ is greater than N, the network is interpolated by K sectors of width $\delta\theta = 180/K$ with square interpolation matrices $W_k$ where $$a(\theta) = W_k e(\theta) \text{ with } e(\theta) = \begin{bmatrix} \exp(-jL_0\theta) \\ \vdots \\ \exp(jL_0\theta) \end{bmatrix} \text{ for } |\theta-\theta_k| < \delta\theta$$

where the K matrices $W_k$ are squared with $N = 2L_0+1$,
the matrices $W_k$ are obtained by minimizing the deviation $\|a(\theta)-W_k e(\theta)\|^2$ in the sense of the mean squares the deviation for $|\theta-\theta_k|<\delta\theta$,
the width of the interpolation cone $\delta\theta$ is determined from the following amplitude error criterion:

$$A\_dB(a(\theta), W_k e(\theta)) =$$

$$\max_{\theta_k-\delta\theta \leq \theta \leq \theta_k-\delta\theta, n} \left\{ 20\log_{10}\left(\left|\frac{a_n(\theta)}{\hat{a}_n(\theta)}\right|\right) \right\} \text{ with } W_k e(\theta) = \begin{bmatrix} \hat{a}_1(\theta) \\ \vdots \\ \hat{a}_N(\theta) \end{bmatrix}$$

where $\delta\theta$ is the minimal value verifying that A_dB is less than 0.1 dB because A_dB is zero when $a(\theta)=W_k e(\theta)$.

4. The method as claimed in claim 1, wherein it comprises a goniometry step comprising at least the following steps:

Step No. B.0: Initialization of an assembly $\Theta$ at $\emptyset$

Step No. B.2: For all P-uplets $(i_1 \ldots i_P)$ verifying $0 \leq i_1 \leq \ldots \leq i_P < K$:

Step No. B.1: Calculate $y^{i_1 \cdots i_P}(t) = W_{i_1 \ldots i_P}^{-1} x(t)$

Step No. B.2: Calculate the $\theta_{i_p} = 2\delta\theta \times i_p$ for $1 \leq p \leq P$ Step No. B.3: Apply a spatial and/or Forward-Backward smoothing technique to the observation $y^{i_1 \cdots i_P}(t)$ and then apply a goniometry algorithm in order to obtain the incidences $\hat{\theta}_k$ for $1 \leq k \leq K_{i_1 \ldots i_P}$ Step No. B.4: Select estimated incidences $\hat{\theta}_k \in \Theta_{i_1 \ldots i_P}$ where $\Theta_{i_1 \ldots i_P} = \{|\hat{\theta}_k - \theta_{i_p}| < \delta\theta$ for $1 \leq p \leq P$ and $J_{music}(\theta) < \eta\}$ Step No. B.5: $\Theta = \Theta \cup \Theta_{i_1 \ldots i_P}$ assemblies of the angles of incidence verifying the step B.4 for all the sectors associated with the P-uplets $(i_1 \ldots i_P)$ processed by the algorithm Step No. B.6: Return to step No. B.1 so long as all the P-uplets $(i_1 \ldots i_P)$ verifying $0 \leq i_1 \leq \ldots \leq i_P < K$ are not explored.

5. The method as claimed in claim 1, wherein, for coherent sources present in different sectors, the steering vector $a(\theta)$ is interpolated jointly on several sectors.

6. The method as claimed in claim 3, wherein it comprises a goniometry step comprising at least the following steps:

Step No. B.0: Initialization of an assembly $\Theta$ at $\emptyset$

Step No. B: For all P-uplets $(i_1 \ldots i_P)$ verifying $0 \leq i_1 \leq \ldots \leq i_P < K$:

Step No. B.1: Calculate $y^{i_1 \cdots i_P}(t) = W_{i_1 \ldots i_P}^{-1} x(t)$

Step No. B.2: Calculate the $\theta_{i_p} = 2\delta\theta \times i_p$ for $1 \leq p \leq P$ Step No. B.3: Apply a spatial and/or Forward-Backward smoothing technique to the observation $y^{i_1 \cdots i_P}(t)$ and then apply a goniometry algorithm in order to obtain the incidences $\hat{\theta}_k$ for $1 \leq k \leq K_{i_1 \ldots i_P}$ Step No. B.4: Select estimated $\hat{\theta}_k \in \Theta_{i_1 \ldots i_P}$ where $\Theta_{i_1 \ldots i_P} = \{|\hat{\theta}_k - \theta_{i_p}| < \delta\theta$ for $1 \leq p \leq P$ and $J_{music}(\theta) < \eta\}$ Step No. B.5: $\Theta = \Theta \cup \Theta_{i_1 \ldots i_P}$ assemblies of the angles of incidence verifying the step B.4 for all the sectors associated with the P-uplets $(i_1 \ldots i_P)$ processed by the algorithm Step No. B.6: Return to step No. B.1 so long as all the P-uplets $(i_1 \ldots i_P)$ verifying $0 \leq i_1 \leq \ldots \leq i_P < K$ are not explored.

\* \* \* \* \*